(12) United States Patent
Bataineh et al.

(10) Patent No.: US 11,481,647 B1
(45) Date of Patent: Oct. 25, 2022

(54) DETERMINING HIGH IMPACT FEATURES FOR A PREDICTION OF A MACHINE LEARNING MODEL

(71) Applicant: Humana Inc., Louisville, KY (US)

(72) Inventors: Mohammad Hindi Bataineh, Louisville, KY (US); Harpreet Singh, Louisville, KY (US)

(73) Assignee: Humana Inc., Louisville, KY (US)

(*) Notice: Subject to any disclaimer, the term of this patent is extended or adjusted under 35 U.S.C. 154(b) by 300 days.

(21) Appl. No.: 16/817,920

(22) Filed: Mar. 13, 2020

Related U.S. Application Data

(60) Provisional application No. 62/820,552, filed on Mar. 19, 2019.

(51) Int. Cl.
G06N 5/04 (2006.01)
G06N 20/00 (2019.01)

(52) U.S. Cl.
CPC .............. G06N 5/04 (2013.01); G06N 20/00 (2019.01)

(58) Field of Classification Search
CPC .................................. G06N 5/04; G06N 20/00
See application file for complete search history.

(56) References Cited

U.S. PATENT DOCUMENTS

| | | | | |
|---|---|---|---|---|
| 9,680,938 B1* | 6/2017 | Gil | .................. | H04L 67/142 |
| 2006/0282660 A1* | 12/2006 | Varghese | .............. | G07F 7/1083 713/155 |
| 2007/0118639 A1* | 5/2007 | Bellifemine | .......... | H04L 67/306 709/224 |
| 2010/0287615 A1* | 11/2010 | Martin | ................ | H04L 63/1416 726/23 |
| 2011/0137833 A1* | 6/2011 | Ide | ......................... | G06N 7/005 706/46 |
| 2011/0137834 A1* | 6/2011 | Ide | ......................... | G06N 20/00 706/12 |
| 2011/0302657 A1* | 12/2011 | Ikegami | ................ | G06F 21/577 726/25 |
| 2013/0104203 A1* | 4/2013 | Davis | .................... | G06F 21/554 726/5 |
| 2014/0199663 A1* | 7/2014 | Sadeh-Koniecpol | ...................... | H04L 63/1408 434/118 |
| 2015/0026027 A1* | 1/2015 | Priess | ................ | G06Q 20/4016 705/35 |
| 2016/0283566 A1* | 9/2016 | Singh | .................... | H04L 67/535 |
| 2017/0111385 A1* | 4/2017 | Madhu | ............... | G06Q 20/4016 |

(Continued)

OTHER PUBLICATIONS

Alvarez-Melis, D. et al., "On the Robustness of Interpretability Methods," arXiv: 1806.08049, Jun. 21, 2018, pp. 66-71.

(Continued)

*Primary Examiner* — J. Brant Murphy
(74) *Attorney, Agent, or Firm* — Fenwick & West LLP

(57) ABSTRACT

A system trains a machine learning based model to predict the likelihood of an outcome for an entity, for example, a user. The system determines, for a particular prediction for a user, impact scores that indicate how each feature of the user impacted the prediction for that user. The feature impact scores are ranked to select features for the user that had the highest impact on the prediction. The system generates a description for the high impact features and provides the description, for example, for display via a user interface.

24 Claims, 7 Drawing Sheets

(56) References Cited

U.S. PATENT DOCUMENTS

2017/0169478 A1* 6/2017 Dey .................... G06Q 30/0255
2017/0230417 A1* 8/2017 Amar ...................... H04L 63/08

OTHER PUBLICATIONS

Apley, D.W., "Visualizing the Effects of Predictor Variables in Black Box Supervised Learning Models," arXiv: 1612.08468, Dec. 27, 2016, pp. 1-36.

Bastani, O. et al., "Interpreting Blackbox Models via Model Extraction," arXiv:1705.08504, May 23, 2017, pp. 1-20.

Fisher, A. et al., "Model Class Reliance: Variable Importance Measures for any Machine Learning Model Class, from the "Rashomon" Perspective," arXiv:1801.01489, Jan. 4, 2018, pp. 1-49.

Fong, R. C. et al., "Interpretable Explanations of Black Boxes by Meaningful Perturbation," arXiv:1704.03296, Apr. 11, 2017, pp. 1-9.

Friedman, J. H. et al., "Predictive Learning via Rule Ensembles," The Annals of Applied Statistics, vol. 2, No. 3, Sep. 2008, pp. 916-954.

Goldstein, A. et al., "Peeking Inside the Black Box: Visualizing Statistical Learning with Plots of Individual Conditional Expectation," arXiv:1309.6392, Mar. 20, 2014, pp. 1-22.

Guidotti, R. et al., "A Survey of Methods for Explaining Black Box Models," ACM Computing Surveys, vol. 51, No. 5, Article 93, Aug. 2018, pp. 1-42.

Ithapu, V. K. et al., "Decoding the Deep: Exploring class hierarchies of deep representations using multiresolution matrix factorization," CVPR Workshop on Explainable Computer Vision and Job Candidate Screening Competition, vol. 2, Jul. 2017, pp. 45-54.

Lakkaraju, H. et al., "Interpretable & Explorable Approximations of Black Box Models," arXiv:1707.01154, Jul. 4, 2017, pp. 1-5.

Lundberg, S. M. et al., "An unexpected unity among methods for interpreting model predictions," arXiv:1611.07478, Dec. 8, 2016, pp. 1-6.

Molnar, C. "Interpretable machine learning. A Guide for Making Black Box Models Explainable", 2019, pp. 1-314, <URL: https://christophm.github.io/interpretable-ml-book/>.

Ribeiro, M.T. et al., "Why Should I Trust You?: Explaining the Predictions of Any Classifier," Proceedings of the 22nd ACM SIGKDD International Conference on Knowledge Discovery and Data Mining, Aug. 2016, pp. 1135-1144.

* cited by examiner

DETERMINING HIGH IMPACT FEATURES FOR A PREDICTION OF A MACHINE LEARNING MODEL

CROSS-REFERENCE TO RELATED APPLICATION

This application claims the benefit of U.S. Provisional Application No. 62/820,552, filed on Mar. 19, 2019, which is incorporated by reference in its entirety.

FIELD OF INVENTION

The disclosure relates to machine learning based models in general and more specifically to determining impact of features processed by a machine learning based model on the result predicted by the model.

BACKGROUND

Machine learning based models are used for various applications, for example, for predicting likelihood of certain user actions, for image analysis, for predicting behavior of processes or systems, for predicting failure of instruments, and so on. Examples of machine learning based models include linear regression, logistic regression, support vector machines, multi-perceptron neural networks, deep learning models, random forest, gradient-boosted trees, and so on. A machine learning based model is typically treated as a black box that provides answers based on some inputs. For example, a system may provide sensor data associated with an instrument as input to neural network to predict failure of the instrument. With the technological advancement in computing power and big-data sources, more complex ML algorithms have become dominant over these simple algorithms in practical applications. Techniques like multi-perceptron neural network, deep learning tools, random forest, and gradient-boosted trees usually outperform the simple ML algorithms.

These more complex algorithms are not interpretable when it comes to explaining individual predictions. For example, if a system uses machine learning for predicting instrument failure, the system is unable to determine which features were the likely cause of the instrument failure. The ability to determine the impact of various features on the output of a machine learning based model provides better understanding of the behavior of entities being modeled and allows appropriate actions to be taken. Conventional techniques are either unable to determine feature impact for machine learning models used in practical applications or are either computationally slow and highly inefficient or suffer from severe limitations.

SUMMARY

A system determines impact of features processed by a trained machine learning model on a result predicted by the model for a particular set of input features. The trained machine learning model is configured to process a set of features and output a score. The set of features may describe an entity, for example, a user, an instrument, a sensor, an image, and so on. The system analyzes a set of observations for determining impact of features. An observation represents an instance of input set of features that are received for processing by the machine learning based model. Each observation comprises a set of feature values. The system identifies high impact features from the set of features and provides information describing the high impact features.

In an embodiment, the system receives the trained machine learning model and a plurality of observations. The system determines an original output score value by executing the machine learning based model using the feature values of the observation. The system determines an aggregate feature value for each feature by aggregating the values of the feature from the observations.

The system performs the following processing for each feature F having a feature value V in the observation. The system determines an input I1 comprising the feature values of the observation, with the feature value for F replaced by the aggregate feature value for F. The system processes the machine learning based model using the input I1 to generate an adjusted output score. The system determines an individual impact score A for the feature F based on the difference between the original output score value and the adjusted output score value. The system determines the individual impact score for each feature. The system selects one or more high impact features from the observation based on the individual impact scores of the features. The system sends the high impact features for display via a user interface of a client device.

In an embodiment, the system determines an aggregate score value $S_m$ by executing the machine learning based model using an input $I_m$ comprising the aggregate feature values. The system further performs the following processing for each feature F having a feature value V in the observation. The system determines another input I2 by replacing the value for feature F in the input $I_m$ comprising the aggregate feature values with the feature value V from the observation. The system processes the machine learning based model using the input I2 to determine a correlated output score value. The system determines a correlated impact score B for the feature F based on the difference between the original output score value and the correlated output score value. The system determines the correlated impact score for each feature. The system uses the correlated impact score B for each of the features as another factor for selecting high impact features from the observation.

In an embodiment, the system selects one or more high impact features from the observation based on the sum of the correlated impact score B and the individual impact score A for each of the features.

In an embodiment, the aggregate feature value for a feature represented using a continuous variable is a median of the feature values for the feature from the plurality of observations. Similarly, the aggregate feature value for a feature represented using a binary variable or a categorical variable is a mode of the feature values for the feature from the plurality of observations.

In an embodiment, the system normalizes the sum of the correlated impact score for the feature and the individual impact score for the feature by dividing the sum with the aggregate score value. The system selects one or more high impact features based on the normalized sum.

In an embodiment, the system determines a feature impact score by determining a sign for the normalized sum. The sign for the normalized sum is determined based on a comparison of the individual impact score and the correlated impact score. In an embodiment, the sign for the feature impact score is negative if the individual impact score is greater than the correlated impact score and the first adjusted score is greater than the output score. Furthermore, the sign for the feature impact score is negative if the correlated impact score is greater than the individual impact score and the aggregate score value is greater than the second adjusted score.

In some embodiments, various portions of the computation can be executed in parallel by multiple processors. For example, computation of feature impact score for each feature may be computed in parallel. Similarly, aggregate features values for different features can be computed in parallel. Parallel processing of the method allows the system to determine feature impact efficiently compared to conventional techniques.

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

The disclosed embodiments have other advantages and features which will be more readily apparent from the detailed description, the appended claims, and the accompanying figures (or drawings). A brief introduction of the figures is below.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

DETAILED DESCRIPTION

Embodiments of the invention provide features describing an entity as input to a machine learning model to predict a score value. Examples of entities include users, computing systems, sensors, instruments, and so on. The system ranks the features of the entity in an order of their impact on the score value predicted for that particular entity. Accordingly, features that had a higher impact in generation of the score value for that particular entity are ranked higher than features that had small impact in generation of the score value. The features with highest impact in determining the score value for that particular entity are referred to as the high impact features. The system generates description of the high impact features for display.

The techniques disclosed can be used with any machine learning based model and have following advantages compared to conventional techniques. (1) The disclosed embodiments preserve and use the original built model to rank top predictors and interpret the predictions. (2) The disclosed embodiments show high performance in terms of execution without running in memory issues or implementation obstacles, which makes them scalable to any application. (3) The disclosed embodiments produce local prediction interpretation for each observation. (4) The disclosed embodiments have broad representation of all predictors in the model without any biases or assumptions and settings that might limit or change the number of represented predictors.

Overall System Environment

Figure 1:
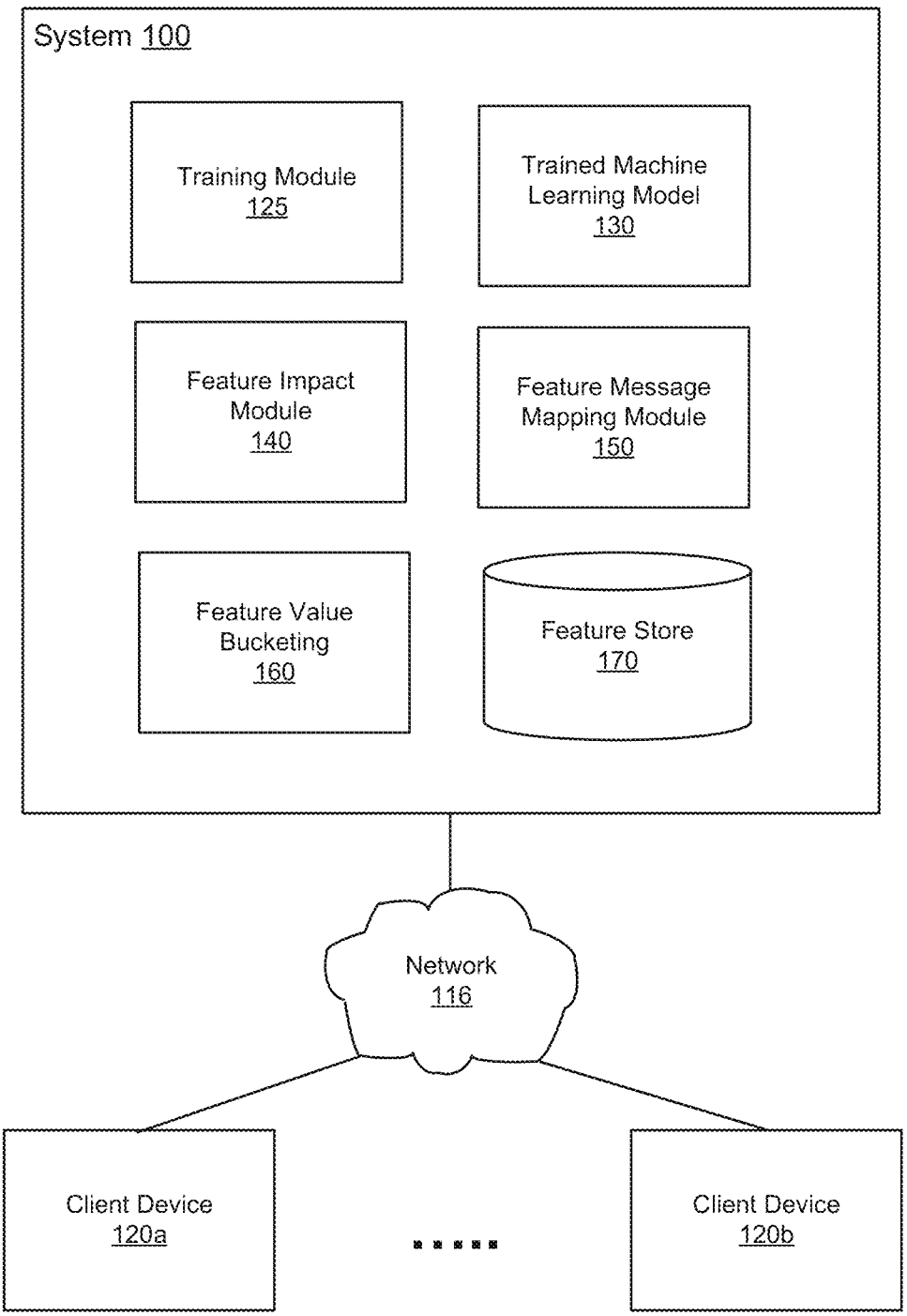
FIG. 1 shows the overall system environment of a system configured to use and analyze machine learning based models, according to an embodiment.

FIG. 1 shows the overall system environment of a system configured to use and analyze machine learning based models, according to an embodiment. The overall system environment 110 includes a system 100, a network 116, and one or more client devices 120. In other embodiments, more or less systems/components than those indicated in FIG. 1 may be used. A user may interact with the system 100 via the client device 120 through the network 116. Furthermore, there may be more or less instances of each system shown in FIG. 1, such as the client device 120.

The system 100 comprises a training module 125, a trained machine learning model 130, a feature impact module 140, a feature value bucketing module 160, a feature message mapping module 150, and a feature store 170. Other embodiments may include other modules. Actions indicated as being performed by a particular module may be performed by other modules than those indicated herein The trained machine learning model 130 receives a set of features as input to predict a score. The trained machine learning model 130 may also be referred to herein as the model. The features may describe certain entity, for example, a user, an instrument, an online system, and so on. The score may predict a behavior of the entity, for example, the entity may represent a user and the score may represent a likelihood of the user performing an action; the entity may represent an instrument and the score may represent a likelihood of failure of the instrument; the entity may represent an online system and the score may represent the likelihood of the online system performing below a threshold, and so on.

The training module 125 uses a training data set to train a machine learning based model to obtain a trained machine learning model 130. Different machine-learning based models, such as linear support vector machine (linear SVM), boosting for other algorithms (e.g., AdaBoost), neural networks, logistic regression, naïve Bayes, memory-based learning, random forests, bagged trees, decision trees, boosted trees, or boosted stumps-may be used in different embodiments. In some embodiments, the training module 125 iteratively re-trains the model 130 until the occurrence of a stopping condition, such as the accuracy measurement indication that the model is sufficiently accurate, or a number of training rounds having taken place The feature store 200 stores features for entities being processed by the trained learning model 130, for example, users. Each user may be associated with a plurality of features, for example, a few hundred features. In an embodiment, the feature store 200 is a database that stores relations between users and features. Examples of features stored in the feature store 200 depend on the type of entity and the type of model. For example, for a user, the feature store 200 may store features describing the user's height, age, fair color, race, ethnicity, marital status, and so on. A feature may also be referred to herein as a variable.

The feature value bucketing module 160 assigns normalized scales to features. For example, the feature value bucketing module 160 may divide a feature value into various ranges and assign a descriptive text string to each range. In an embodiment, the feature value bucketing module 160 stores a feature bucket mapping table that maps ranges of feature values to textual description of the feature values, for example, range of feature values "x>=80" may be mapped to "large values", range of feature values "x<40" may be mapped to "small values", and range of feature values "x>=40 and x<80" may be mapped to "medium values." The feature value bucketing module 160 provides these descriptions to the feature message mapping module 150.

The feature message mapping module 150 generates human readable messages for presenting to users. The feature message mapping module 150 assigns descriptive names to features and also descriptive names to ranges of values of the features to generate a readable text string describing a feature value. The feature message mapping module 150 provides the human readable description for high impact features to users for display via a user interface or as messages.

The feature impact module 140 determines the high impact features that impacted the score value for a particular entity. For example, the trained machine learning model 130 may receive one hundred features as input, $x_1$, $x_2$, $x_3$, $x_4$, ... $x_{100}$. The trained machine learning model 130 may generate a score $S_1$ for entity $E_1$ and score $S_2$ for entity $E_2$. For an entity $E_1$, the feature impact module 140 may identify features $x_4$, $x_7$, and $x_6$ as the high impact features that caused the model to generate the score value $S_1$ and for entity $E_2$, the feature impact module 140 may identify features $x_{12}$, $x_{17}$, and $x_3$ as the high impact features that caused the model to generate the score value $S_2$.

The feature impact module 140 determines an impact score for a feature $x_i$ for a user u. Assume that the trained machine learning model 130 receives as input, features $x_1$, $x_2$, $x_3$, ... $x_m$ and determines an output score. The feature impact module 140 determines an aggregate value for each feature across a plurality of observations. The aggregate value may be a mean, median, or mode value. The feature impact module 140 determines the impact score or the feature impact score $Y_x$ for feature $x_i$ using equation (1).

$$Y_x = U_x \times \left| \frac{|S_x - S_o| + |S_m - S_c|}{S_m} \right| \quad (1)$$

In equation (1), $S_x$ represents predicted score when only feature x is set to its aggregate value while all other input features are kept at their original values; $S_c$ represents predicted score when all input features except x are set to their aggregate values and feature x is kept at its original value; $S_m$ represents the predicted score when all features to their aggregate values, for example, median value calculated for each numeric feature and mode value calculated for each categorical feature; and $S_o$ represents the predicted score when all feature values represent the original input values.

The feature impact module 140 determines the impact sign $U_x$ using the following equation (2). The impact sign $U_x$ is multiplied with an absolute impact score represented by the expression $$\left| \frac{|S_x - S_o| + |S_m - S_c|}{S_m} \right|$$

in equation (1).

$$U_x = \begin{cases} -1, & \text{if } (|S_x - S_o| \geq |S_m - S_c|) \text{ and } (S_x \geq S_o) \\ -1, & \text{if } (|S_m - S_c| \geq |S_x - S_o|) \text{ and } (S_m \geq S_c) \\ 1, & \text{Otherwise} \end{cases} \quad (2)$$

The client device 120 used by a user for interacting with the online system 100 can be a personal computer (PC), a desktop computer, a laptop computer, a notebook, a tablet PC executing an operating system, for example, a Microsoft Windows®-compatible operating system (OS), Apple OS X®, and/or a Linux distribution. In another embodiment, the client device 120 can be any device having computer functionality, such as a personal digital assistant (PDA), mobile telephone, smartphone, wearable device, etc.

The interactions between the client devices 120 and the system 100 are typically performed via network 116, for example, via the Internet. The network enables communications between the client device 120 and the system 100. In one embodiment, the network 116 uses standard communications technologies and/or protocols. The data exchanged over the network can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network 116 can also include links to other networks such as the Internet.

FIG. 1 and the other figures use like reference numerals to identify like elements. A letter after a reference numeral, such as "120a," indicates that the text refers specifically to the element having that particular reference numeral. A reference numeral in the text without a following letter, such as "120," refers to any or all of the elements in the figures bearing that reference numeral (e.g. "120" in the text refers to reference numerals "120a" and/or "120b" in the figures).

Figure 2:
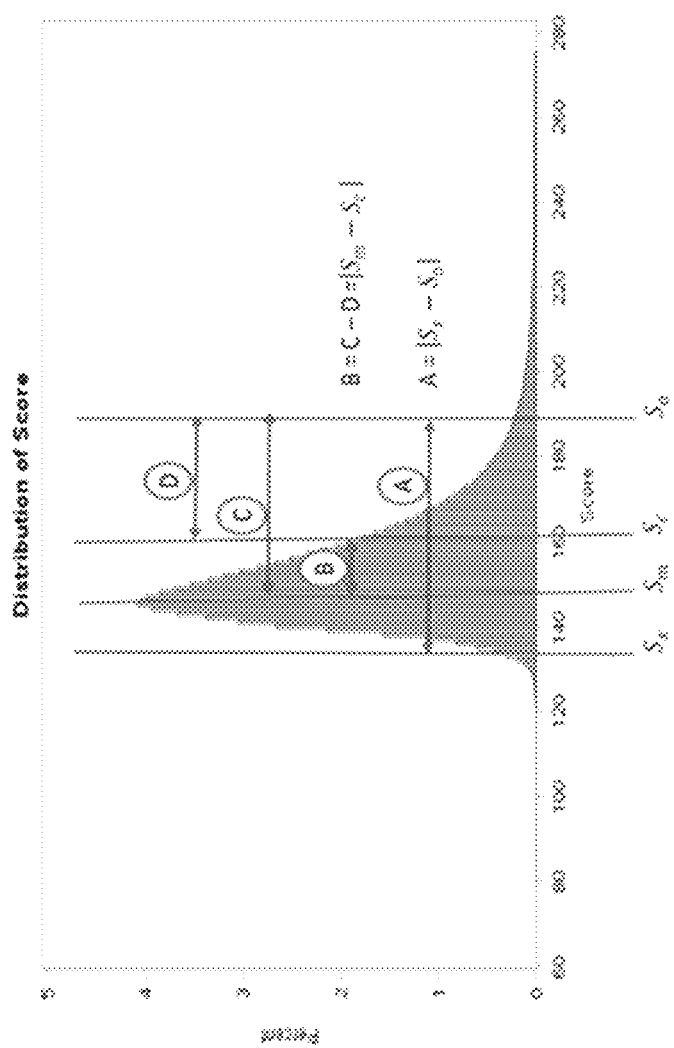
FIG. 2 illustrates the computation of the impact scores performed by the feature impact module according to an embodiment.

FIG. 2 illustrates the computation of the impact scores performed by the feature impact module according to an embodiment. FIG. 1 represents the scores distribution for the trained machine learning model 130. In FIG. 2, the individual impact for feature x is obtained in (A), which represents the first part $|S_x-S_o|$ of Equation 1. The correlated impact for feature x is obtained in (B), which represents the second part $|S_m-S_c|$ in Equation 1. The final net impact is normalized by dividing the sum of A and B by $|S_m-S_c|$ which is the result of setting all features to their aggregate values, allowing for all features impacts to be evaluated relative to each other. Both impacts A and B isolate the entire effect of feature x on the original predicted score $S_o$ by eliminating the features' extreme values by adjusting them to their aggregate value.

With respect to the impact sign $U_x$ that is presented in Equation 2, the larger impact portion between A and B determines the final sign of the net impact. If A>B, then feature x has a negative impact only when $S_x \geq S_o$. Accordingly, removing feature x impact, which is represented by the score $S_x$, leads to a higher score compared to the original score $S_o$. This indicates that having feature x with its current value reduces the score $S_o$ from what it should be when x has a normal value (i.e., set to median/mode value). Similarly, when B>A, then feature x impact is negative when $S_m \geq S_c$.

The feature impact calculations are repeated over all features for the same observation. The system determines a normalized impact for each feature that can be compared relative to other features for the same observation. Features then can be ranked by positive, negative, or absolute impact. To make the features impact scores more interpretable to end users, the features impacts are normalized by dividing each feature impact $Y_x$ by the maximum feature impact for the same observation.

Processes

Figure 3:
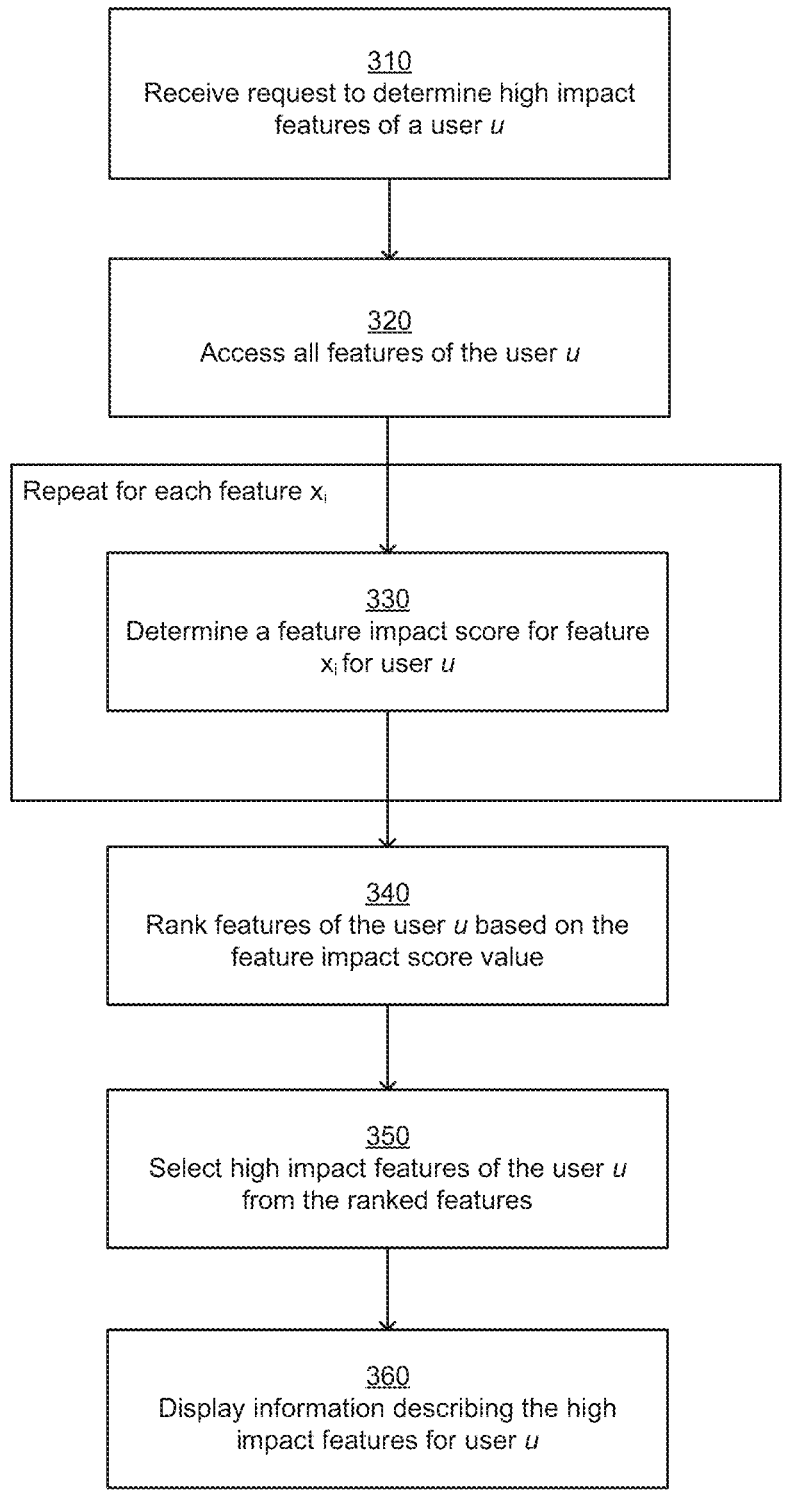
FIG. 3 shows a flowchart illustrating the overall process for determining high impact features for a user, according to an embodiment.
Figure 4:
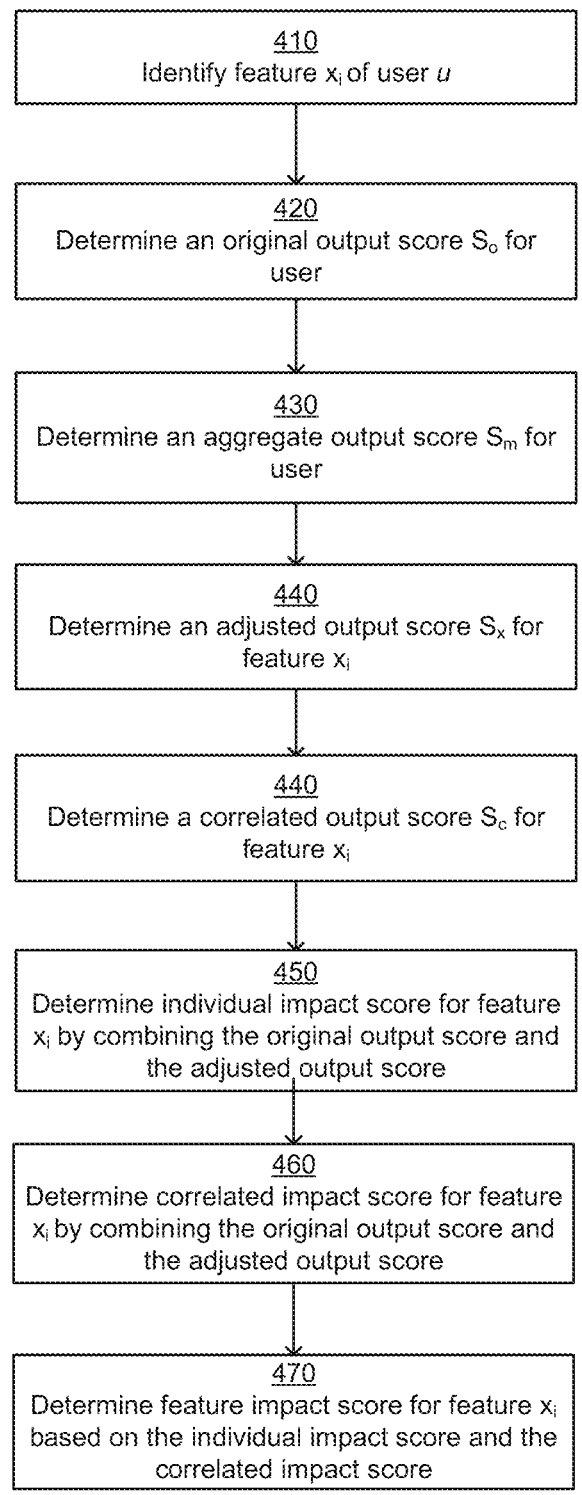
FIG. 4 shows a flowchart illustrating the process for determining feature impact score for a feature, according to an embodiment.
Figure 5:
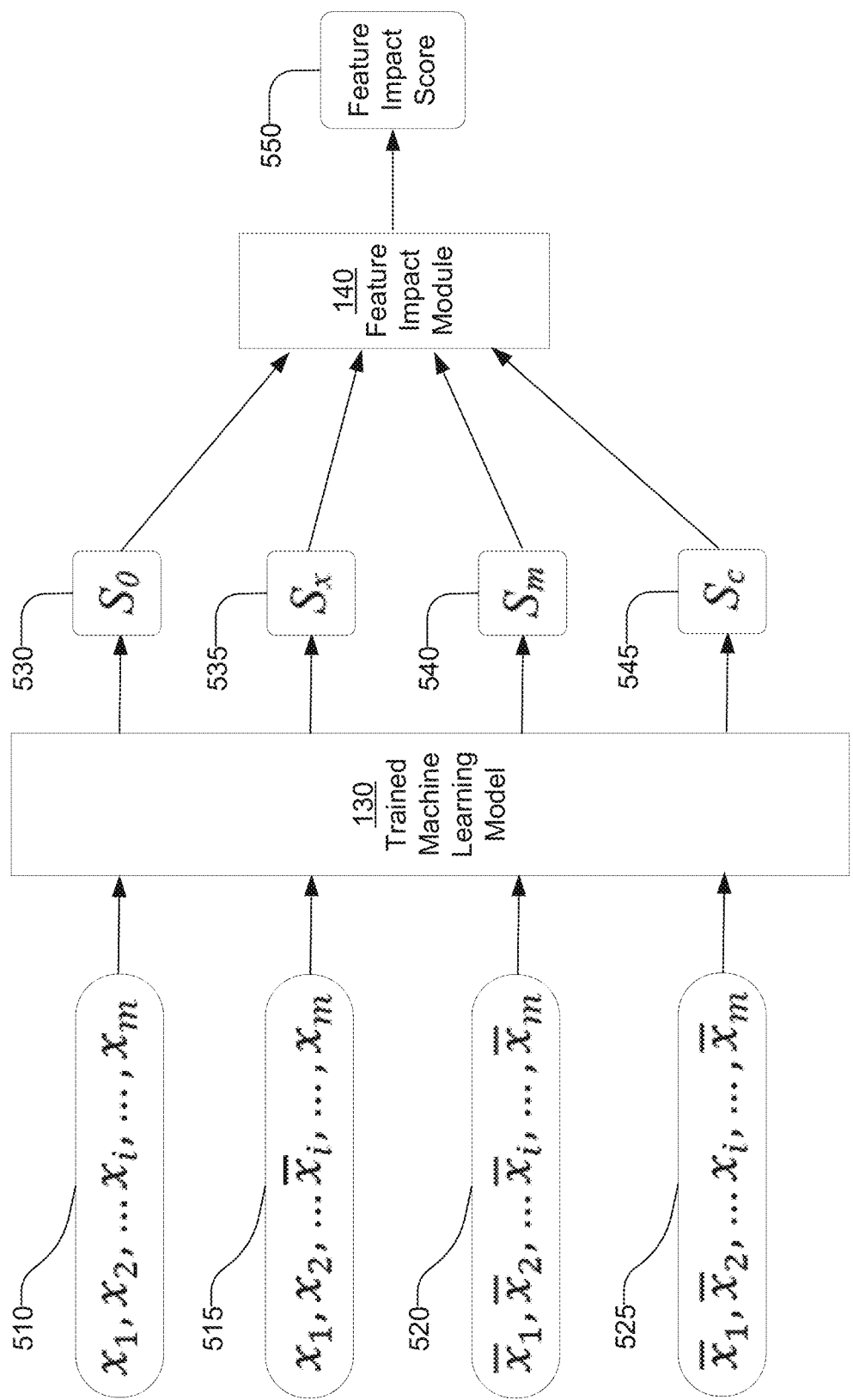
FIG. 5 illustrates the data flow of the process for determining feature impact score for a feature, according to an embodiment.

FIGS. 3-5 illustrate various processes executed by the system 100. The steps described herein may be performed by modules other than those described herein. Furthermore, the steps may be performed in an order different from that shown herein, for example, certain steps may be performed in parallel. Although the following process is described for a trained machine learning model 130 that predicts a score for a user u, the techniques described can be applied for any machine learning based model that predicts any value for any entity.

FIG. 3 shows a flowchart illustrating the overall process for determining high impact features for a user, according to an embodiment. The system 100 receives 310 a request to determine high impact features for the user u. The request may be received from an application running on a client device 120. Alternatively, the system 100 may determine high impact features for one or more users in an offline manner, for example, as a batch process.

The feature impact module 140 accesses 320 features of the user u from the feature store 170. The features may be represented as $x_1, x_2, x_3, \ldots x_m$. For each feature $x_i$, the feature impact module 140, determines 330 a feature impact score of feature $x_i$ for user u. In an embodiment, the feature impact score is determined using equations (1) and (2).

The feature impact module 140 ranks 340 features of the user u based on the feature impact score values. The feature impact module 140 selects 350 the high impact features of the user from the ranked features. The feature impact module 140 may store the high impact features or send them for display, for example, via a client device 120. In an embodiment, the high impact features are displayed 360 along with information describing the features as determined by the feature message mapping module 150.

FIG. 4 shows a flowchart illustrating the process for determining feature impact score for a feature, according to an embodiment. The steps described herein may be performed by modules other than those described herein. Furthermore, the steps may be performed in an order different from that shown herein, for example, certain steps may be performed in parallel.

FIG. 5 illustrates the data flow of the process for determining feature impact score for a feature, according to an embodiment. Accordingly, the steps of the flowchart of FIG. 4 are illustrated using the data flow illustrated in FIG. 5.

The feature values for the user are represented as $x_1, x_2, x_3, \ldots x_m$. The feature impact module 140 identifies 410 a feature $x_i$, for which the feature impact score needs to be determined. The feature impact module 140 determines 420 an original output score $S_o$ by providing the feature values of the user, i.e., $x_1, x_2, x_3, \ldots x_m$ as input to the trained machine learning model 130.

The feature impact module 140 determines 430 an aggregate output score $S_m$ by providing the feature values of the user, i.e., $x_1, x_2, x_3, \ldots x_m$ as input to the trained machine learning model 130. As illustrated in FIG. 5, the features $x_1, x_2, x_3, \ldots x_m$ are represented as 510 and result in generation of original output score 530.

The feature impact module 140 determines an aggregate value for each feature, for example, the aggregate value $\bar{x}_i$ for feature $x_i$ across a plurality of users. The aggregate feature value may be for example, median value for a numeric feature and mode value for a categorical feature. The feature impact module 140 provides the aggregate feature values for all the features, for example, $\bar{x}_1, \bar{x}_2, \ldots \bar{x}_i, \ldots, \bar{x}_m$ as input to the trained machine learning model 130 to determine an aggregate output score $S_m$. As illustrated in FIG. 5, the features $\bar{x}_1, \bar{x}_2, \ldots \bar{x}_i, \ldots, \bar{x}_m$ are represented as 550 and result in generation of aggregate output score 540.

The feature impact module 140 determines 440 an adjusted output score $S_x$ by executing the trained machine learning model using an input obtained by replacing the value of the feature $x_i$ in the plurality of original feature values with the aggregate feature value $\bar{x}_i$ for the feature $x_i$. Accordingly, the feature impact module 140 provides the input $x_1, x_2, \ldots \bar{x}_i, \ldots x_m$ to generate the adjusted output score $S_x$. As illustrated in FIG. 5, the features $x_1, x_2, \ldots x_i, \ldots, x_m$ are represented as 515 and result in generation of adjusted output score 535.

The feature impact module 140 determines 440 a correlated impact score $S_c$ as follows. The feature impact module 140 determines an input comprising the plurality of aggregate feature values with the aggregate feature value for the feature replaced by the original feature value. Accordingly, feature impact module 140 determines the input $\bar{x}_1, \bar{x}_2, \ldots \bar{x}_i, \ldots, \bar{x}_m$ and provides the input to the trained machine learning model 130 to determine a correlated output score value $S_c$. As illustrated in FIG. 5, the features $\bar{x}_1, \bar{x}_2, \ldots x_i, \ldots, \bar{x}_m$ are represented as 525 and result in generation of correlated output score $S_c$ represented as 545.

As shown in FIG. 5, the feature impact module 140 determines the feature impact score 550 using the original output score 530, the aggregate output score 540, the adjusted output score 535, and the correlated output score 545.

More specifically, as shown in FIG. 4, the feature impact module 140 determines 450 an individual impact score by combining the original output score and the adjusted output score. In an embodiment, the individual impact score is determined based on the difference between the original output score and the adjusted output score. In an embodiment, the individual impact score is determined as the absolute value of the difference between the original output score value and the adjusted output score value.

The feature impact module 140 determines 460 a correlated impact score based on the aggregate output score and the correlated output score. In an embodiment, the individual impact score is determined based on the difference between the aggregate output score and the correlated output score. In an embodiment, the correlated impact score is determined as the absolute value of the difference between the aggregate output score and the correlated output score.

The feature impact module 140 determines 470 the feature impact score based on the individual impact score and the correlated impact score. In an embodiment, the feature impact module 140 determines 470 the feature impact score based on the sum of the individual impact score and the correlated impact score.

In an embodiment, the feature impact module 140 divides the sum of the correlated impact score for the feature and the individual impact score for the feature by the aggregate output score to determine a normalized sum value. The feature impact module 140 determines the feature impact score for a feature based on the normalized sum value.

In an embodiment, the feature impact module 140 determines a sign value for the feature impact score based on a comparison of the individual impact score and the correlated impact score. In an embodiment, the feature impact module 140 determines the sign value for the feature impact score to be negative if the individual impact score is greater than the correlated impact score and the first adjusted score is greater than the output score. In an embodiment, the feature impact module 140 determines the sign value for the feature impact score to be negative if the correlated impact score is greater than the individual impact score and the aggregate output score is greater than the second adjusted score. In an embodiment, the feature impact module 140 determines the feature impact score using the equation 1 and the sign value using the equation 2.

The feature message mapping module 150 generates a message describing the high impact features for a user and provides the message either for display via a user interface or for transmitting via a message to a user.

Figure 6:
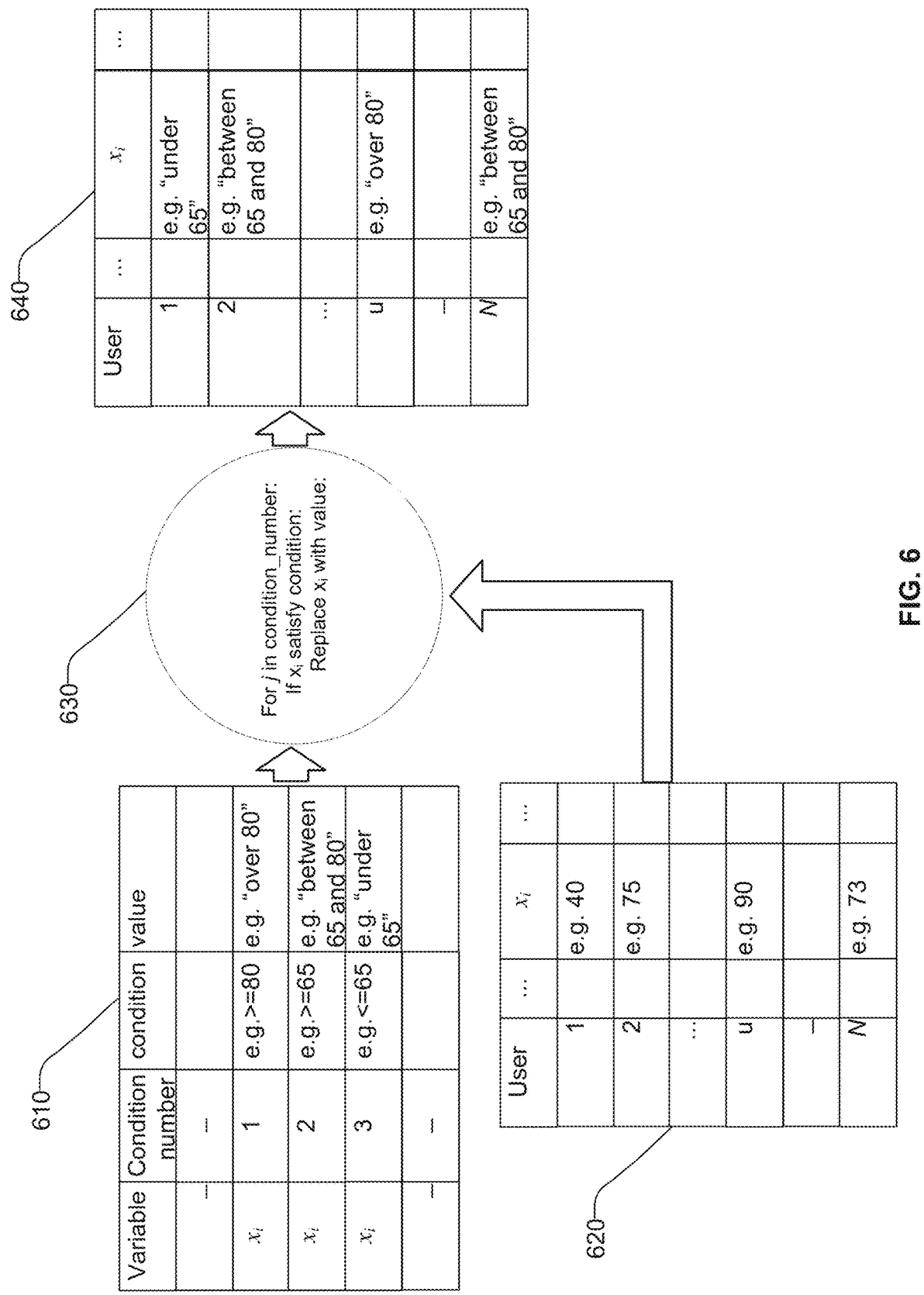
FIG. 6 illustrates the process of determination of a message for display for the high impact features for a user, according to an embodiment.

FIG. 6 illustrates the process of determination of a message for display for a high impact feature for a user, according to an embodiment. The feature message mapping module 150 maintains a feature bucket mapping table 610 that maps feature values to messages, for example, feature values that are greater than or equal to 80 are mapped to message "over 80", feature values less than 65 are mapped to message "under 65" and so on. The feature impact module 140 determines values 620 of the features for each user. If the feature is identified as a high impact feature for a user, the feature message mapping module 150 determines a condition representing the value of the feature and replaces 630 the feature value with the description corresponding to the condition from table 610 to generate a description for the feature of the user as stored in table 640.

Figure 7:
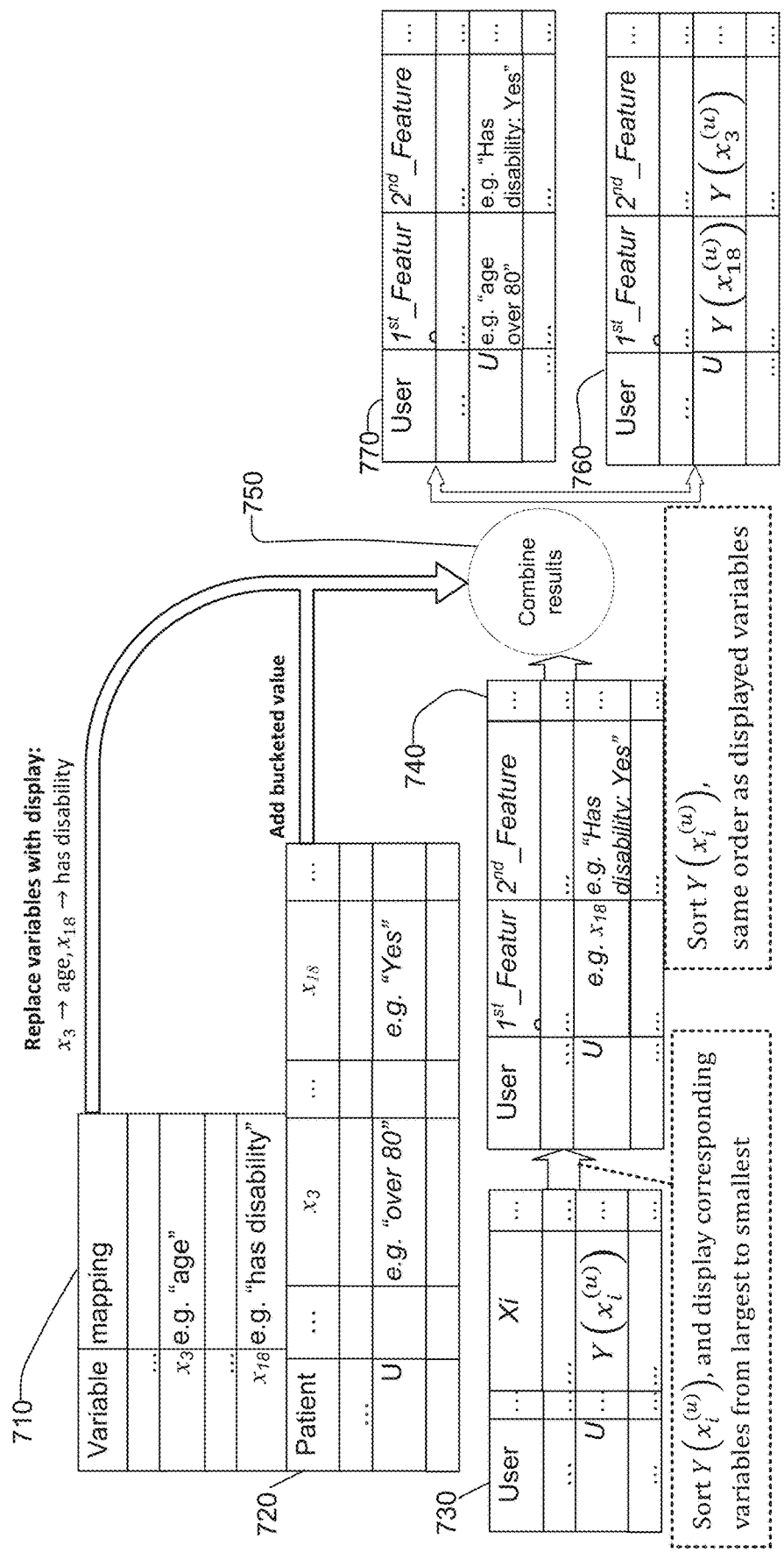
FIG. 7 illustrates the process of displaying high impact features for users, according to an embodiment.

FIG. 7 illustrates the process of displaying high impact features for users, according to an embodiment. The feature message mapping module 150 stores a table 710 mapping features to their display names, for example, feature $x_3$ has a display name "age". The feature message mapping module 150 determines a table 720 that stores the text messages describing the bucketed values of features. Table 720 in FIG. 7 corresponds to table 640 of FIG. 6. The feature impact module 140 determines a table 730 that stores the feature impact scores for various features for each user. The feature impact module 140 ranks features for each user to determine the features representing the high impact features 740. The high impact feature for each user may be different. The feature message mapping module 150 receives requests to display information or specific users and combines the values stored in the tables 740, 710, and 720 to generate table 760 that stores the feature impact scores for the high impact features for the selected user and table 770 that stores the corresponding display text for the features.

Embodiments of the invention comprise systems and processes for determining impact of features with an efficient computation and an efficient use of memory during execution compared to conventional techniques. That is because, along with one fixed score $S_m$ that is used for all features, the processes determine only two new scores $S_x$ and $S_c$ for each feature to calculate the impact. In comparison, existing techniques perform expensive calculations and their computation time increases exponentially with the number of features. The embodiments disclosed perform computations using new observations equal to twice the number of features. Furthermore, the disclosed techniques can be used independent of the type of machine leaning technique.

Applications

The techniques disclosed can be used for various types of applications. For example, the machine learning based model may received features describing sensors and predict a likelihood of a sensor failing. The embodiments of the invention can be used to determine the high impact features that explain why a particular sensor has high likelihood of failure.

As another example, a machine learning based model may receive features describing users that represent patients of a medical facility and predict a likelihood of a user visiting emergency room (ER). The embodiments of the system may determine high impact features that describe users that have a high likelihood of visiting the ER room.

As another example, the machine learning based model receives features describing content items and users and predicts a likelihood of a user interacting with a content item. Embodiments can determine high impact features that describe a particular content item and a particular user if the model predicts a high likelihood of the user interacting with the content item.

Additional Considerations

It is to be understood that the Figures and descriptions of the present invention have been simplified to illustrate elements that are relevant for a clear understanding of the present invention, while eliminating, for the purpose of clarity, many other elements found in a multi-tenant system. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Some portions of the above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A computer-implemented method for determining impact of features on the output of a trained machine learning model, the method comprising:
   receiving a trained machine learning model configured to receive values of a plurality of features as input and predict a score, the features describing user actions performed by a user;
   receiving a plurality of original feature values for a user, each original feature value representing a value of a feature from the plurality of features;
   determining an original output score by executing the trained machine learning model using input comprising the plurality of original feature values;
   for each feature from the plurality of features:
      determining an aggregate feature value by aggregating values of the feature over a plurality of observations;
      executing the trained machine learning model using an input obtained by replacing the value of the feature in the plurality of original feature values with the aggregate feature value for the feature, the execution generating an adjusted output score; and
      determining an individual impact score for the feature by combining the original output score and the adjusted output score;
   selecting one or more high impact features from the plurality of features based on factors comprising the individual impact scores of the features;
   generating a description of each of the one or more selected high impact features; and
   sending the generated description for display.

2. The computer-implemented method of claim 1, further comprising:
   determining an aggregate output score by executing the trained machine learning model using input comprising the aggregate feature values;
   for each feature from the plurality of features:
      determining a second input comprising the plurality of aggregate feature values with the aggregate feature value for the feature replaced by the original feature value;
      determining a correlated output score by executing the trained machine learning model using the second input; and
      determining a correlated impact score for the feature based on a difference between the aggregate output score and the correlated output score; and
   wherein the factors used for selecting the one or more high impact features from the plurality of features further comprise the correlated impact score for the feature.

3. The computer-implemented method of claim 2, further comprising:
   wherein the factors used for selecting the one or more high impact features from the plurality of features comprises the sum of the correlated impact score for the feature and the individual impact score for each of the plurality of features.

4. The computer-implemented method of claim 3, further comprising:
   dividing the sum of the correlated impact score for the feature and the individual impact score for the feature by the aggregate output score to determine a normalized sum value; and
   wherein selecting the one or more high impact features from the plurality of features is based on the normalized sum value.

5. The computer-implemented method of claim 4, wherein selecting the one or more high impact features from the plurality of features comprises:
   for each feature from the plurality of features, determining a sign value for a feature impact score based on a comparison of the individual impact score and the correlated impact score.

6. The computer-implemented method of claim 5, wherein the sign value for the feature impact score is negative if the individual impact score is greater than the correlated impact score and a first adjusted score is greater than the output score.

7. The computer-implemented method of claim 5, wherein the sign value for the feature impact score is negative if the correlated impact score is greater than the individual impact score and the aggregate output score is greater than a second adjusted score.

8. The computer-implemented method of claim 1, wherein the aggregate feature value for a feature represented using a continuous variable is a median of the feature values for the feature from the plurality of observations.

9. The computer-implemented method of claim 1, wherein the aggregate feature value for a feature represented using one of a binary variable or a categorical variable is a mode of the feature values for the feature from the plurality of observations.

10. A non-transitory computer readable storage medium, storing instructions that when executed by a computer processor, cause the computer processor to perform steps comprising:
receiving a trained machine learning model configured to receive values of a plurality of features as input and predict a score, the features describing user actions performed by a user;
receiving a plurality of original feature values for a user, each original feature value representing a value of a feature from the plurality of features;
determining an original output score by executing the trained machine learning model using input comprising the plurality of original feature values;
for each feature from the plurality of features:
determining an aggregate feature value by aggregating values of the feature over a plurality of observations;
executing the trained machine learning model using an input obtained by replacing the value of the feature in the plurality of original feature values with the aggregate feature value for the feature, the execution generating an adjusted output score; and
determining an individual impact score for the feature by combining the original output score and the adjusted output score;
selecting one or more high impact features from the plurality of features based on factors comprising the individual impact scores of the features;
generating a description of each of the one or more selected high impact features; and
sending the generated description for display.

11. The non-transitory computer readable storage medium of claim 10, wherein the instructions further cause the computer processor to perform steps comprising:
determining an aggregate output score by executing the trained machine learning model using input comprising the aggregate feature values;
for each feature from the plurality of features:
determining a second input comprising the plurality of aggregate feature values with the aggregate feature value for the feature replaced by the original feature value;
determining a correlated output score by executing the trained machine learning model using the second input; and
determining a correlated impact score for the feature based on a difference between the aggregate output score and the correlated output score; and
wherein the factors used for selecting the one or more high impact features from the plurality of features further comprise the correlated impact score for the feature.

12. The non-transitory computer readable storage medium of claim 11, wherein the instructions further cause the computer processor to perform steps comprising:
wherein the factors used for selecting the one or more high impact features from the plurality of features comprises the sum of the correlated impact score for the feature and the individual impact score for each of the plurality of features.

13. The non-transitory computer readable storage medium of claim 12, wherein the instructions further cause the computer processor to perform steps comprising:
dividing the sum of the correlated impact score for the feature and the individual impact score for the feature by the aggregate score value to determine a normalized sum value; and
wherein selecting the one or more high impact features from the plurality of features is based on the normalized sum value.

14. The non-transitory computer readable storage medium of claim 13, wherein instructions for selecting the one or more high impact features from the plurality of features cause the computer processor to perform steps comprising:
for each feature from the plurality of features, determining a sign value for a feature impact score based on a comparison of the individual impact score and the correlated impact score.

15. The non-transitory computer readable storage medium of claim 14, wherein the sign value for the feature impact score is negative if the individual impact score is greater than the correlated impact score and a first adjusted score is greater than the output score.

16. The non-transitory computer readable storage medium of claim 14, wherein the sign value for the feature impact score is negative if the correlated impact score is greater than the individual impact score and the aggregate output score is greater than a second adjusted score.

17. The non-transitory computer readable storage medium of claim 10, wherein the aggregate feature value for a feature represented using a continuous variable is a median of the feature values for the feature from the plurality of observations.

18. The non-transitory computer readable storage medium of claim 10, wherein the aggregate feature value for a feature represented using one of a binary variable or a categorical variable is a mode of the feature values for the feature from the plurality of observations.

19. A computer-implemented method for determining impact of features on the output of a trained machine learning model, the method comprising:
receiving a trained machine learning model configured to receive values of a plurality of features as input and predict a score, the features describing an entity;
receiving a plurality of original feature values for an entity, each original feature value representing a value of a feature from the plurality of features;
determining an original output score by executing the trained machine learning model using input comprising the plurality of original feature values;
for each feature from the plurality of features:
determining an aggregate feature value by aggregating values of the feature over a plurality of observations;
executing the trained machine learning model using an input obtained by replacing the value of the feature in the plurality of original feature values with the aggregate feature value for the feature, the execution generating an adjusted output score; and
determining an individual impact score for the feature by combining the original output score and the adjusted output score; and
outputting information describing one or more high impact features for processing by a target system.

20. The computer-implemented method of claim 19, further comprising:
determining an aggregate output score by executing the trained machine learning model using input comprising the aggregate feature values;
for each feature from the plurality of features:
determining a second input comprising the plurality of aggregate feature values with the aggregate feature value for the feature replaced by the original feature value;
determining a correlated output score by executing the trained machine learning model using the second input; and
determining a correlated impact score for the feature based on a difference between the aggregate output score and the correlated output score; and
wherein the factors used for selecting the one or more high impact features from the plurality of features further comprise the correlated impact score for the feature.

21. The computer-implemented method of claim 20, further comprising:
wherein the factors used for selecting the one or more high impact features from the plurality of features comprises the sum of the correlated impact score for the feature and the individual impact score for each of the plurality of features.

22. The computer-implemented method of claim 21, further comprising:
dividing the sum of the correlated impact score for the feature and the individual impact score for the feature by the aggregate output score to determine a normalized sum value; and
wherein selecting the one or more high impact features from the plurality of features is based on the normalized sum value.

23. The computer-implemented method of claim 22, wherein selecting the one or more high impact features from the plurality of features comprises:
for each feature from the plurality of features, determining a sign value for a feature impact score based on a comparison of the individual impact score and the correlated impact score.

24. The computer-implemented method of claim 19, wherein the aggregate feature value for a feature represented using a continuous variable is a median of the feature values for the feature from the plurality of observations and the aggregate feature value for a feature represented using one of a binary variable or a categorical variable is a mode of the feature values for the feature from the plurality of observations.

* * * * *